United States Patent
Trinkel et al.

(10) Patent No.: US 8,200,276 B2
(45) Date of Patent: Jun. 12, 2012

(54) COMMUNICATION METHOD

(75) Inventors: Marian Trinkel, Kreuzau OT Untermaubach (DE); Christel Mueller, Schulzendorf (DE); Frank Daussmann, Hassloch (DE); Jakob Ph. Hoepelman, Renningen (DE)

(73) Assignee: Deutsche Telekom AG, Bonn (DE)

( * ) Notice: Subject to any disclaimer, the term of this patent is extended or adjusted under 35 U.S.C. 154(b) by 1462 days.

(21) Appl. No.: 11/248,821

(22) Filed: Oct. 12, 2005

(65) Prior Publication Data

US 2006/0079223 A1     Apr. 13, 2006

(30) Foreign Application Priority Data

Oct. 12, 2004   (DE) .................. 10 2004 049 562

(51) Int. Cl.
*H04M 1/00* (2006.01)
(52) U.S. Cl. .................... 455/554.2; 455/436
(58) Field of Classification Search .......... 455/445, 455/436–444, 552.1–554.2
See application file for complete search history.

(56) References Cited

U.S. PATENT DOCUMENTS

| | | | |
|---|---|---|---|
| 4,856,046 A | 8/1989 | Streck et al. | |
| 5,259,021 A | 11/1993 | Antilla et al. | |
| 5,333,174 A | 7/1994 | Sato et al. | |
| 6,600,734 B1 * | 7/2003 | Gernert et al. | 370/352 |
| 7,143,171 B2 * | 11/2006 | Eriksson et al. | 709/227 |
| 7,257,386 B1 | 8/2007 | McDonnell et al. | |
| 2002/0061013 A1 | 5/2002 | Yoshida et al. | |
| 2003/0036375 A1 | 2/2003 | Chen et al. | |
| 2003/0040310 A1 | 2/2003 | Barakat et al. | |
| 2004/0242230 A1 * | 12/2004 | Rue | 455/433 |
| 2005/0041645 A1 | 2/2005 | Kamari et al. | |

FOREIGN PATENT DOCUMENTS

| | | |
|---|---|---|
| EP | 0449119 | 10/1991 |
| EP | 1175113 | 1/2002 |
| EP | 1207656 | 5/2002 |
| JP | 2001016367 | 1/2001 |
| JP | 2001211114 A * | 8/2001 |
| WO | WO-9811710 | 3/1998 |
| WO | WO-03017698 | 2/2003 |
| WO | WO-03041348 | 8/2003 |

OTHER PUBLICATIONS

European Search Report for EP 05 01 8046 mailed Jan. 18, 2006.

* cited by examiner

*Primary Examiner* — Steven Lim
(74) *Attorney, Agent, or Firm* — Leydig, Voit & Mayer, Ltd.

(57) ABSTRACT

A method for communication over a telecommunications network includes selecting a public telecommunication station located in the vicinity of a mobile telephone. The public telecommunication station is used by the mobile telephone as an access point to the telecommunications network.

2 Claims, 1 Drawing Sheet

COMMUNICATION METHOD

Priority is claimed to German patent application DE 10 2004 049 562.9, the entire subject matter of which is hereby incorporated by reference herein.

The present invention relates to a method and system for communication, in particular, voice communication/data communication over a telecommunications network, using a mobile communication device, in particular, a mobile telephone.

BACKGROUND

In the prior art it is known that the users of a mobile telephone can communicate with other parties over a telecommunications network, and especially the GSM network here, usually independently of time and space. In this connection, mobile telephones have now reached a very high acceptance among users, because it is now possible to make calls from almost any place in the world, at any time.

In this connection, mobile telephones are increasingly replacing public telecommunication stations, such as public telephone booths, which are less and less accepted by telephone users. This is mainly because public telecommunication stations are not found everywhere, and also because usually small change or special phonecards are needed to use such a telecommunication station, for example, a public telephone booth, but the potential users often do not have change or phonecards available.

Furthermore, public telecommunication stations are often subject to vandalism by third parties, so that these telecommunication stations are often not operational when actually needed. Such vandalism manifests itself, for example, in that these telecommunication stations are broken into to steal the cash contained within, or that, for the pure sake of vandalism, device components, such as receivers/keypads, of the telecommunication stations are torn off and removed, resulting in damage to the device.

Moreover, public telecommunication stations are often unhygienic.

The operators of such communication stations in public locations are facing increased maintenance costs, but the income from these telecommunication stations often no longer covers maintenance and other costs. Therefore, public telecommunication stations, such as publicly accessible telephone booths, are increasingly becoming a loss-making business for telecommunication service providers.

In spite of the fact that the tariffs for the use of public telecommunication stations are usually lower than those for the use of mobile telephones in the mobile telecommunications network, the public telecommunication stations are being used less and less.

SUMMARY OF THE INVENTION

It is an object of the present invention to provide a telecommunication method and system which allows a user to continue to enjoy the convenience of his/her mobile telephone, but which also increasingly integrates public telecommunication stations, especially existing ones, into the communication methods. Another, alternative, object is to offer mobile telephone users a different (for example, less expensive) communication path.

The present invention provides a method for communication over a telecommunications network, using a mobile telephone. A public telecommunication station located in a vicinity of the mobile telephone is selected and used for the mobile telephone as an access point, at least as a virtual access point, to a telecommunications network. The communication may be voice communication. The public telecommunication station may be a public telephone booth.

According to the present invention, the user of a mobile telephone uses his/her mobile telephone for a communication, but, during use, the user or third parties benefit from the fact that a public telecommunication station, such as an already existing telephone booth, or one which is retrofitted for this purpose, provides access to a telecommunications network, such as the wired landline network.

In this connection, access to a telecommunications network can be provided via the public telecommunication station either actually physically, or only virtually.

When access is actually physically provided, the public telecommunication station is located in the vicinity of the mobile telephone, since a call or other communication, such as a data communication, to be made using the mobile telephone, is actually carried out via the public telecommunication station as a piece of equipment, i.e., here as a practical access provider to a telecommunications network.

In contrast, if the existence of a public telecommunication station in the vicinity of the mobile telephone is used only as a virtual access point, then this means that only the existence of a public telecommunication station is required, but an actual communication is not handled directly via the public telecommunication station. Thus, the existence of a public telecommunication station in the vicinity of a mobile telephone is only used as a means for access authorization.

The method of the present invention results in that public telecommunication stations, such as public telephone booths, will be put to new or increased use, including the possibility of giving the mobile telephone user a tariff advantage over the conventional use of the mobile telecommunications network.

Accordingly, in accordance with the present invention, a mobile telephone used according to the invention essentially constitutes a wireless handset, in particular, receiver, microphone and keypad, of the public telecommunication station, so that such a public telecommunication station does not necessarily have to have a wired handset, thus reducing the risk of vandalism. Furthermore, there is no need to carry coins or phonecards to be able to use a public telecommunication station because, in accordance with the present invention, the telecommunication performed is preferably billed using the mobile telephone user data.

In the context of the present invention, it is perceived as being advantageous that a public telecommunication station can be used as an access point to a telecommunications network for a plurality of mobile telephones at the same time, especially by giving a plurality of users of mobile telephones simultaneous access, for example, to the landline telephone network via the same public telecommunication station, in particular a telephone booth. This also prevents waiting lines of potential users from forming at public telephone booths. Instead, a plurality of users can get access to the telephone network via the one telephone booth at the same time, using their own mobile telephones.

Wider acceptance of such communication can be achieved by a provider of such services, for example, by charging lower tariffs and fees for a mobile telephone communication made via a public telecommunication station as an access point to a telephone network than would be the case for a conventional radio telecommunication via the mobile telecommunications network.

This allows a network operator to optimize the network and/or to retain customers and generate increased turnover, especially in the business of public telecommunication stations.

Furthermore, provision can be made for a communication to be necessarily handled via a public telecommunication station located in the vicinity. In this connection, a communication made via a public telecommunication station may possibly be subjected a further operation or passed through a service, such as a monitoring service, especially for monitoring the content of a communication. Such an operation or such a service can be executed directly in the public telecommunication station or at a later stage, for example, by an entity through which a communication, or any communication, originating from the public telecommunication station is passed.

In the context of the present invention, a telecommunication station is referred to as public if it is available to a plurality of users, or possibly only to a closed group of a plurality of users.

In this connection, the selection of a public telecommunication station in a vicinity of a mobile telephone used can be made in any manner inferable by those skilled in the art.

In an embodiment of the present invention, this can be accomplished, for example, by a mobile telephone sending out a radio signal, especially one of limited range, which can then be received by a public telecommunication station. After this, a communication, which may initially be a pure data communication, can take place between the two communication devices so as to create the access to a telecommunications network, whereupon the actual voice communication, or also a further data communication, can take place.

In addition, in the event that, for example, a plurality of public telecommunication stations exist within the range of the radio signal, a suitable telecommunication station may be selected, for example, as a function of a reception quality, or the received field strength, or a different parameter.

Furthermore, the radio signal may be limited, essentially to within sight distance from the public telecommunication station, with the maximum sight distance being, for example, 100 meters, preferably 10 meters. Thus, it becomes clear that essentially only one public telecommunication station can be selected.

In another embodiment, a public telecommunication station may be selected as a function of the network address of the mobile telephone when calling an arbitrary telephone number, or, in particular, a service telephone number starting the service. Such a telephone number or service telephone number can start a service within the network, causing the selection of a public telecommunication station located in the vicinity, unless the intention is for the service to be carried out by default when calling a network address.

In accordance with this aspect of the present invention, this is essentially accomplished by analyzing the network address of the mobile telephone used. This network address, essentially the so-called "Home Location Register", informs the telecommunications network in which the mobile telephone is used of the radio network cell in which the mobile telephone is currently located, thus making it possible to locate the mobile telephone.

Therefore, a service in the telecommunications network in which the above-mentioned telephone number is dialed, for example, the GSM network, is able to determine the location of the mobile telephone, and to use the then known location to select a specific public telecommunication station, especially the nearest one, known to the used telecommunications network from internally available data. The telecommunication station selected in this manner can then, in turn, be used as an access point to a telecommunications network, especially to the wired landline network.

In the context of the method of to the present invention, it holds in general that a public telecommunication station can be selected, for example, as a function of an identifier, especially an identifier transmitted by the mobile telephone during communication setup.

This identifier may be, for example, the network identifier (for example, the Home Location Register, HLR), a device identifier (for example, the International Mobile Equipment Identity, IMEI), a card identifier (for example, the SIM card number), or a user identifier (for example, biometric data such as fingerprint, voice, etc.)

Thus, in addition to the above-mentioned location finding, it is also possible to check further criteria according to which access to the inventive service is enabled or not. For example, it is possible to analyze a card identifier to determine the network provider used by a mobile telephone customer for making phone calls.

Then perhaps only users who use a specific provider for making phone calls or who meet other required criteria could be authorized for the method of the present invention. Thus, it is also possible to distinguish by specific user groups (for example, age, gender, provider, class and type of device, all users in a specific location, etc.).

In one embodiment, provision can be made for the service-starting telephone number mentioned above to be called by pressing a single key on the mobile telephone. This key can be a key which is already present on the mobile telephone, such as a key of the normal keypad, or else a special function key provided on special mobile telephones.

In newer generation mobile telephones, for example, the so-called PTT (push-to-talk) key can be used for that purpose as well. It is generally known for such a key on the mobile telephone to start a communication with a closed group of other telecommunication devices. In the method of the present invention, such a group of addressable telecommunication devices may include one or more public telephone booths. Then, one public telephone booth of this group can be selected as an access point, for example, automatically or by the user. To this end, the "group call" with all possible telephone booths initiated using a key or a telephone number can be converted to a private call with one selected telephone booth.

In a further alternative embodiment of the present invention, a public telecommunication station may be assigned an individual service telephone number, said public telecommunication station being selected by calling this telephone number from a mobile telephone.

In order to ensure that a user who has gained knowledge of such a telephone number does not call when he/she is actually no longer in the vicinity of the public telecommunication station, provision can be made for the service telephone number to be displayed to potential users, for example, at the public telecommunication station and in such a manner that it changes over time. This ensures that such a telephone number can only be called when the user is in the vicinity of the telecommunication station and able to read the telephone number displayed there. In this connection, the service telephone number displayed can therefore be valid only for a limited period of time.

As mentioned earlier, it is not necessarily required for a method of the present invention to be initiated by calling a special network identifier. Instead, all communications originating from mobile telephones or other mobile communication devices in a specific location or from a specific surrounding area may be routed via a public telecommunication station.

A communication connection between a mobile telephone and a selected public telecommunication station, such as a public telephone booth, can be carried out as described above in any manner, for example, using the usually provided mobile telecommunications network (GSM network) and/or via a direct radio link between the mobile telephone and the public telecommunication station. Especially the latter type of communication may be used if already the selection of the public telecommunication station is not carried out over the mobile telecommunications network to which the mobile telephone is logged on.

During a communication over a mobile telecommunications network, such as GSM, a double routing may occur, namely, for example, first from the mobile communication device (for example, a cell phone) to a first communication network (for example, GSM), from there to a public telecommunication station (for example, a telephone booth), and then from the telecommunication station further to another network (for example, the telephone network, Internet, etc). This is advantageous especially if the routing via the public telecommunication station provides an additional service.

In addition to pure voice or data communication from the user of the mobile telephone to, for example, another user or any other telecommunication device, the communication between the mobile telephone and the public communication station may also include a communication which essentially concerns the setup of the access, i.e., a first starting communication during which it is established that a communication between a mobile telephone and a selected telecommunication station is to take place. To this end, any protocol commonly known to those skilled in the art or to be developed may be used. In particular, provision can be made for public telecommunication stations to be retrofitted to be able to provide such functionality. This may also apply to both existing mobile telephone and those to be developed.

For example, a public telephone booth may have a modulator to modulate received voice data packets (for example, Voice over IP via GPRS) and convert them to "acoustic" signals which can be transmitted, for example, over an ISDN network.

In the context of the method of to the present invention, a public telecommunication station, after being selected, may make itself known to the user of the mobile telephone as a possible access point and require the user to confirm the selection, so that access to the telecommunications network is enabled only after such confirmation, so that, for example upon confirmation, a user may establish a communication connection to a desired telephone number, for example, by dialing the respective telephone number on the keypad of the mobile telephone.

In another embodiment, a communication performed may be given an identifier of the public telecommunication station. Accordingly, the communication is treated within the network as if it originated directly from the public telecommunication station. This can be accomplished, for example, using a corresponding entry in the call detail record, which is always generated during a communication.

In the context of the present invention, a "mobile telephone" may be taken to mean not only a mobile telephone according to the standards known today (such as GSM), but also a device that is only suitable to be used as a wireless handset, for example, receiver and transmitter, for a public telephone booth.

Public telecommunication stations are, in particular, telephone booths or Internet hotspots.

BRIEF DESCRIPTION OF THE DRAWINGS

Exemplary embodiments of the present invention are shown in the drawings, in which.

DETAILED DESCRIPTION

Figure 1:
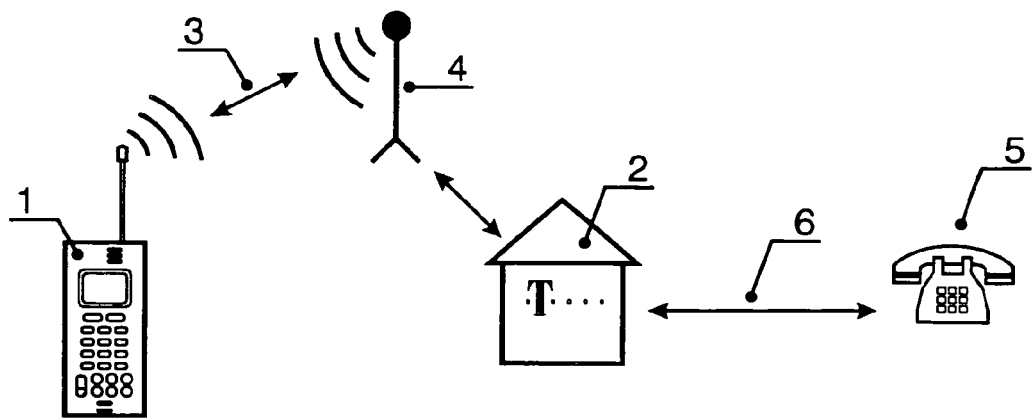
FIG. 1 shows the selection of a public telephone booth over the mobile telecommunications network, with the communication being physically made via the public telephone booth.

FIG. 1 shows a preferred exemplary embodiment, in which, within the framework a normal mobile telephone connection 3 within the mobile telecommunications network (for example, GSM), the user of a mobile telephone 1 is initially given access to the mobile telecommunications network via a receiving antenna 4, for example, by dialing a service telephone number, possibly by simply pressing a key on mobile telephone 1, and in which, moreover, the location of mobile radio device 1 is determined within the network, for example, within a switching center (not shown here), which can be accomplished, for example, based on the home location register or the radio network cell within which mobile radio device 1 is logged on to the network.

Then, it can be determined within the network which is the nearest or a suitable public telephone booth 2 to provide access to a telecommunications network, such as the landline network of a telecommunications provider. To this end, initially, a communication can take place between mobile telephone 1 and public telephone booth 2 over the GSM or mobile telecommunications network, during which the user is first informed of the selection and prompted to enter a telephone number of another conversation partner 5 to be called.

Then, the telecommunications connection is connected over mobile telecommunications network 3 to telephone booth 2, and from there to telephone network 6 of a landline telephone network provider.

In this embodiment of the present invention, public telephone booth 2 is used as an actually physically acting switching center or access point to telephone network 6 of the network operator. Due to the fact that, using this method of the present invention, the mobile telecommunications network is utilized only to a small degree, the tariffs may possibly be lower when using method of the present invention than when communicating only over the mobile telecommunications network.

Figure 2:
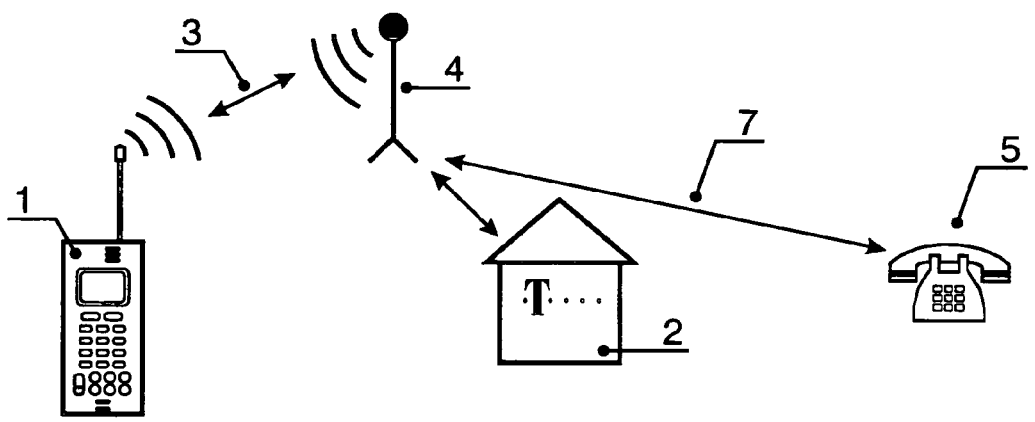
FIG. 2 shows the selection of a public telephone booth as a virtual access point over the mobile telecommunications network, with the communication with a further user being made over the mobile telecommunications network.

FIG. 2 shows an exemplary embodiment, in which, as previously described, a telephone booth 2 located in the vicinity of mobile telephone 1 is selected, namely, for example, by analyzing the home location register. In this case, however, telephone booth 2, after being selected, is valued only as a means for access authorization, i.e., the actual communication connection 7 between mobile telephone 1 and another user having a communication device 5 is not carried out via the public telephone booth, but using the known conventional method of communication between mobile telecommunications network 3 and the landline network. Therefore, public telephone booth 2 provides only a virtual access point, which may still provide a tariff advantage, as described for the previous embodiment.

Figure 3:
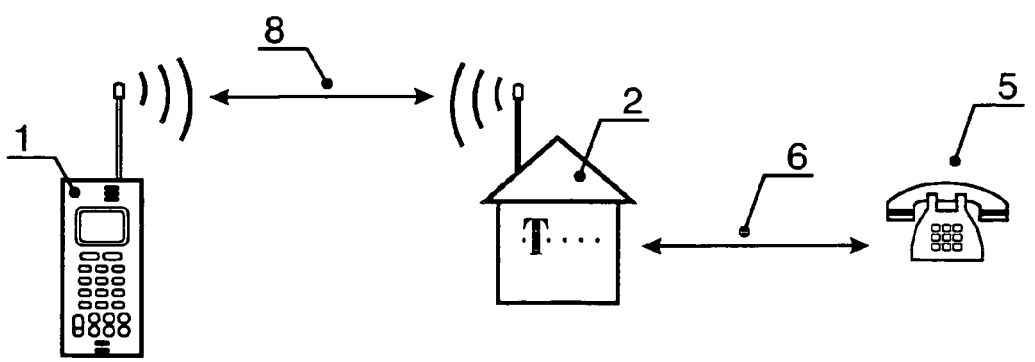
FIG. 3 shows the selection of a public telephone booth via a direct radio link, with the communication being made via the public telephone booth.

FIG. 3 shows a variant of the method of the present invention in which a direct radio link is established between a mobile telephone 1 and a public telephone booth 2, while by-passing the usually used mobile telecommunications network (for example, GSM).

This can be done, for example, using signals of limited range, so that the purely radio-based communication between the two telecommunication devices can take place only within the range, for example, within sight distance, of the devices and/or by distinguishing user groups. Thus, the direct wireless communication between mobile telephone 1 and telephone booth 2 via radio link 8 is in turn able to provide access to public telephone network 6, in particular, the land-line network of a network operator, so that the user of a mobile telephone can establish a communication to the user of the other communication device 5 in this manner as well.

Although not explicitly described in the exemplary embodiments, conceivable embodiments may allow one and the same telephone booth 2 to constitute a public access point for a plurality of users of a plurality of mobile telephones 1. Accordingly, in accordance with the present invention, mobile telephone 1 provides the user with the functionality of a wireless receiver with respect to a public telephone booth located in the vicinity.

Although the examples and general description speak of mobile telephones for voice communication, it is, of course, also possible to perform a data communication in the manner described above, in which, for example, a portable computer contains a mobile GSM telephone interface card, and thus may get access to, for example, the Internet via a public telephone booth instead of, and at a lower cost than, over the normal mobile telecommunications network.

What is claimed is:

1. A method for communication over a telecommunications network, the method comprising:
   selecting a public telecommunication station disposed in a vicinity of a first mobile telephone;
   using the public telecommunication station by the first mobile telephone as an access point to a telecommunications network; and
   assigning an individual service telephone number to the public telecommunication station, and wherein the selecting is performed by calling the individual service telephone number from the first mobile telephone.

2. The method as recited in claim 1 further comprising changing the individual service telephone number over time.

\* \* \* \* \*